3,155,655
3-SUBSTITUTED-4-METATHIAZANONES AND
OXIDE DERIVATIVES
Alexander R. Surrey, Albany, N.Y., assignor to Sterling Drug Inc., New York, N.Y., a corporation of Delaware
No Drawing. Filed Oct. 16, 1962, Ser. No. 231,010
13 Claims. (Cl. 260—243)

This invention relates to 4-metathiazanones, -1-oxides and -1,1-dioxides, and is more particularly concerned with certain 3-substituted derivatives thereof and methods for the preparation of such derivatives.

Among the compounds of my invention are those of the Formula I

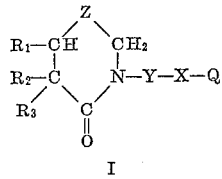

I where Z is S, SO or $SO_2$; Y is alkylene having from two to six carbon atoms and having its two free valence bonds on different carbon atoms or Y is methylene only when X is a direct linkage; X is a direct linkage or O; Q is hydrogen, lower-alkyl or phenyl; and $R_1$, $R_2$ and $R_3$ each is hydrogen or lower-alkyl. Thus, this aspect of my invention is a compound selected from the group consisting of 2-unsubstituted-3-(Q—X—Y)-4-metathiazanones having up to three lower-alkyl radicals substituted in the 5- and 6-metathiazanone ring positions, and, -1-oxides, and -1,1-dioxides thereof where Q, X and Y are defined as above.

The physical embodiments of my invention have been tested by standard pharmacological evaluation procedures and found to possess pharmacological activity, e.g., anticonvulsant properties. The compounds where Z is S have further utility as intermediates for the preparation of my compounds where Z is SO or $SO_2$. Also, the compounds where Z is SO can be used as intermediates for the preparation of the compounds where Z is $SO_2$.

The alkylene radical designated above as Y has from two to six carbon atoms and has its two free valence bonds, i.e., connecting linkages, on different carbon atoms and is illustrated by

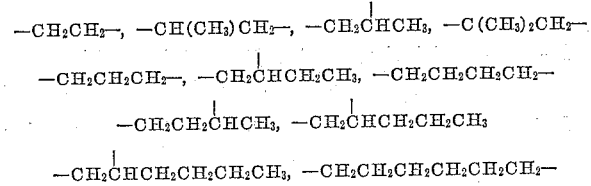

and the like.

The term "lower-alkyl," e.g., as one of the meanings for Q, $R_1$, $R_2$ or $R_3$ in Formula I, as used herein, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

When Q in Formula I is phenyl, the benzene ring thereof can be substituted by low-molecular weight substituents such as lower-alkyl, lower-alkoxy, lower-alkylmercapto, lower-alkylsulfonyl, halo, trifluoromethyl, nitro, amino, lower-alkylamino, lower-carboxylic-acylamino, hydroxy, and the like. These substituents can be in any of the available positions of the phenyl nucleus, and where more than one substituent is present, they can be the same or different and they can be in any of the various position combinations relative to each other. The halo substituents include chloro, bromo, iodo and fluoro. The lower-alkyl, lower-alkoxy, lower-alkylmercapto, lower-alkylsulfonyl, lower-alkylamino, lower carboxylic-acylamino, and the like substituents have preferably from one to six carbon atoms which can be methyl, ethyl, n-propyl, isobutyl, n-hexyl, methoxy, isobutoxy, ethylmercapto, n-amylmercapto, isopropylsulfonyl, n-butylsulfonyl, ethylamino, n-butylamino, acetylamino, propionylamino, and the like.

The compounds of Formula I where Z is S are prepared preferably by heating a mixture of formaldehyde, an amine of the formula Q—X—Y—$NH_2$ and a beta-mercaptopropionic acid of the formula

HS—CH($R_1$)C($R_2$)($R_3$)COOH

The reaction is carried out preferably using a temperature range of about 65° C. to about 100° C. The reaction probably takes place in three steps which may be illustrated diagrammatically as follows:

$$HCHO + Q-X-Y-NH_2 \xrightarrow{1} CH_2=N-Y-X-Q + H_2O$$
II  III  IV

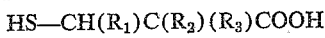

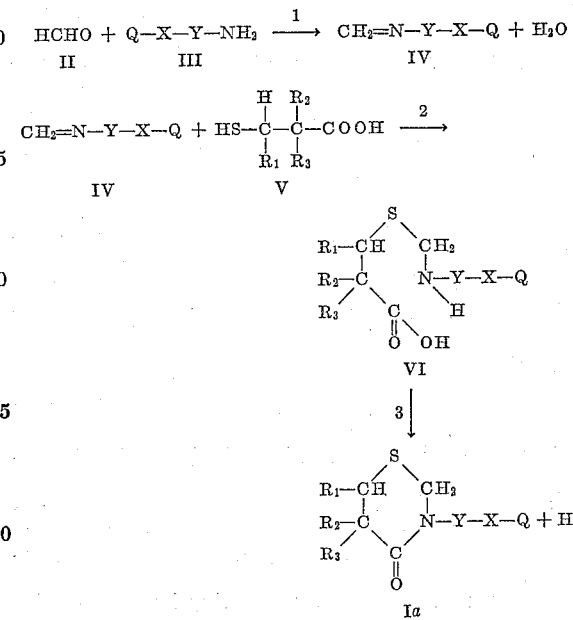

Thus, in the first step (1) formaldehyde (II) is condensed with the amine (III) to yield an azomethine (IV) plus water. In the second step (2) the beta-mercaptopropionic acid (V) adds to the carbon-nitrogen double bond of the azomethine (IV) to yield the aminomethyl-mercaptopropionic acid derivative (VI) which cyclizes in the third step (3) to yield the desired 4-metathiazanone (Ia) plus a second molecule of water. The process is usually carried out without isolating the intermediate azomethine (IV) or the aminomethylmercaptopropionic acid derivative (VI). Since two molar equivalents of water (one in each of steps 1 and 3) are formed for every mole of metathiazanone (Ia) produced, the extent of condensation (in step 1) and cyclization (in step 3) can be followed and the reaction time ascertained by carrying out the procedure in an inert, nonpolar solvent such as benzene and collecting the water in a continuous separator connected to the apparatus. The procedure is carried out preferably in refluxing benzene until no more water is collected. Paraformaldehyde is used preferably as the source of formaldehyde; however, other sources can be used, e.g., an aqueous solution of formaldehyde. Illustrative of the process of my invention is the preparation of 3-n-hexyl-4-metathiazanone using paraformaldehyde, n-hexylamine and beta-mercaptopropionic acid as reactants.

The above procedure, while being the preferred method of preparing my 3-(Q—X—Y)-4-metathiazanones, can be modified, but with no particular advantage. For example, the preparation can be run at lower temperatures down to about room temperature but the reaction time required is longer; or it can be carried out without a solvent or using other solvents such as toluene, ethanol, isopropanol, n-hexane, and the like.

The 3-(Q—X—Y)-4-metathiazanone-1-oxides (Formula I where Z is SO) of my invention are prepared by oxidizing the corresponding 3-(Q—X—Y)-4-metathiazanones. This oxidation is carried out by reacting the metathiazanone with an oxiding agent effective to oxidize sulfides to sulfoxides. Various oxidative procedures can be employed, but the one preferred in practicing my invention comprises using a per-organic acid, e.g., peracetic acid, in a suitable solvent, e.g., ethyl acetate. The reaction is exothermic and is carried out preferably by mixing the reactants at a low temperature, i.e., from 0° C. to 10° C. Other oxidizing agents that can be used are other per-organic acids, e.g., perbenzoic acid.

The 3-(Q—X—Y)-4-metathiazanone-1,1-dioxides of my invention (Formula I where Z is $SO_2$) are prepared by oxidizing the corresponding metathiazanones (Formula I where Z is S). This oxidation is carried out by reacting the metathiazanone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide ($CrO_3$), and the like. Also, the oxidation can be carried out using an excess of a per-organic acid, e.g., peracetic acid, at about room temperature (20–25° C.) for two or more days. Alternatively, the 3-(Q—X—Y)-4-metathiazone-1,1-dioxides can be prepared by oxidizing the corresponding 1-oxides (Formula I where Z is SO), using these same oxidizing agents effective to oxidize sulfides to sulfones, e.g., potassium permanganate, hydrogen peroxide, etc.

The chemical structures of my 3-(Q—X—Y)-4-metathiazanones and corresponding -1-oxides and -1,1-dioxides are established by the mode of their syntheses and corroborated by the correspondence of calculated and found values for the elementary analyses for representative examples.

The following examples will further illustrate specific embodiments of the invention without, however, limiting it thereto.

EXAMPLE 1

3-n-heptyl-4-metathiazanone was prepared as follows: A mixture containing 3 g. of paraformaldehyde, 11.5 g. of n-heptylamine, 10.6 g. of β-mercaptopropionic acid and 100 cc. of benzene was refluxed for 18 hours with a continuous separator connected to the reaction vessel for removal of water formed by the reaction. After this heating period, a total of 3.6 cc. of water had been collected. The reaction mixture was then washed well with dilute ammonium hydroxide solution and then with dilute hydrochloric acid, and filtered. The filtrate was evaporated in vacuo to remove the benzene. The remaining oily material was distilled in vacuo to yield 14.8 g. of the product, 3-n-heptyl-4-metathiazanone, a colorless liquid, B.P. 95–96° C. at 0.005 mm.

*Analysis.*—Calcd. for $C_{11}H_{21}NOS$: N, 6.52; S, 14.90. Found: N, 6.22; S, 14.83.

Following the procedure described in Example 1 using molar equivalent quantities of paraformaldehyde, β-mercaptopropionic acid and the appropriate amine, the 3-substituted-4-metathiazanones of Table A were prepared:

*Table A*

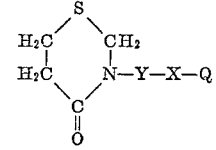

| Example | Y | X | Q | B.P., ° C./mm. |
|---|---|---|---|---|
| 2 | $(CH_2)_4$ | | H | 70/0.08. |
| 3 | $(CH_2)_6$ | | H | 136–142/2.7. |
| 4 | $(CH_2)_6$ | | $C_2H_5$ | 97–102/0.002. |
| 5 | $(CH_2)_6$ | | $C_3H_7$-n | 133–138/0.005. |
| 6 | $(CH_2)_2$ | O | $C_6H_5$ [a] | 115–118/0.05. |
| 7 | $(CH_2)_2$ | O | $C_6H_4$-4-Cl [b] | 173–176/0.025. |
| 8 | $(CH_2)_2$ | O | $C_6H_3$-3,4-$Cl_2$ [c] | [d] |
| 9 | $(CH_2)_2$ | | $C_6H_5$ [a] | [e] |

[a] $C_6H_5$=phenyl.
[b] $C_6H_4$-4-Cl=4-chlorophenyl.
[c] $C_6H_3$-3,4-$Cl_2$=3,4-dichlorophenyl.
[d] M.P. 105.2–106.2° C. (corr.); recrystallized twice from isopropyl alcohol.
[e] M.P. 67–68.3° C.; recrystallized twice from n-hexane.

Following the procedure described in Example 1 and using molar equivalent quantities of paraformaldehyde and the appropriate amines and β-mercaptoalkanoic acids, the following compounds can be prepared:

3-methyl-4-metathiazanone using methylamine and β-mercaptopropionic acid;

3-benzyl-4-metathiazanone using benzylamine and β-mercaptopropionic acid;

3-ethyl-4-metathiazanone using ethylamine and β-mercaptopropionic acid;

3-n-decyl-4-metathiazanone using n-decylamine and β-mercaptopropionic acid;

3-(6-hydroxyhexyl)-4-metathiazanone using 6-hydroxyhexylamine and β-mercaptopropionic acid;

3-(2-n-propoxypropyl)-4-metathiazanone using 2-n-propoxypropylamine and β-mercaptopropionic acid;

3-(4-ethoxybutyl)-4-metathiazanone using 4-ethoxybutylamine and β-mercaptopropionic acid;

3-(2-n-hexoxyethyl)-4-metathiazanone using 2-n-hexoxyethylamine and β-mercaptopropionic acid;

3-[4-4-ethylphenoxy)butyl]-4-metathiazanone using 4-(4-ethylphenoxy)butylamine and β-mercaptopropionic acid;

3 - [ 2- (2,4,6-trimethylphenyl)ethyl]-4-metathiazanone using 2-(2,4,6-trimethylphenyl) ethylamine and β-mercaptopropionic acid;

3-[2-(4-n-butoxyphenoxy)ethyl]-4-metathiazanone using 2-(4-n-butoxyphenoxy)ethylamine and β-mercaptopropionic acid;

3 - [3-(3-ethylmercaptophenyl)propyl]-4-metathiazanone using 3-(3-ethylmercaptophenyl)propylamine and β-mercaptopropionic acid;

3 - [4-(2-methylsulfonylphenyl)butyl]-4-metathiazanone using 4-(2-methylsulfonylphenyl) butylamine and β-mercaptopropionic acid;

3 - [3-(3-trifluoromethylphenoxy)propyl]-4-metathiazanone using 3-(3-trifluoromethylphenoxy) propylamine and β-mercaptopropionic acid;

3-[2-(4-nitrophenyl)ethyl]-4-metathiazanone using 2-(4-nitrophenyl)ethylamine and β-mercaptopropionic acid;

3 - [2-(4-aminophenyl)ethyl]-4-metathiazanone is prepared preferably by reacting the corresponding 3-[2-(4-nitrophenyl)ethyl]-4-metathiazanone with a reducing agent effective to reduce nitro groups to amino groups, e.g., iron and HCl;

3 - [3-(3,4,5-trimethoxyphenyl)propyl]-4-metathiazanone using 3-(3,4,5-trimethoxphenyl) propylamine and β-mercaptopropionic acid;

3 - [2 - (4-n-butylaminophenyl)ethyl]-4-metathiazanone using 2-(4-n-butylaminophenyl)ethylamine and β-mercaptopropionic acid;

3-[3-(-propionylaminophenyl) propyl]-4-metathiazanone using (3-(3-propionylaminophenyl) propylamine and β-mercaptopropionic acid;

3-[2-(4-hydroxphenyl)ethyl]-4-metathiazanone using 2-(4-hyroxyphenyl)ethylamine and β-mercaptopropionic acid;

3-n-heptyl-5-methyl-4-metathiazanone using n-heptylamine and α-methyl-β-mercaptopropionic acid;

5-ethyl-3-isobutyl-4-metathiazanone using isobutylamine and α-ethyl-β-mercaptopropionic acid;

5,5-dimethyl-3-(2-methoxyethyl)-4-metathiazanone using 2-methoxyethylamine and α,α-dimethyl-β-mercaptopropionic acid;

5,5-diethyl-3-[2-(4-methoxyphenoxy) ethyl]-4-metathiazanone using 2-(4-methoxyphenoxy)ethylamine and α,α-diethyl-β-mercaptopropionic acid;

3-n-octyl-5-n-propyl-4-metathiazanone using n-octylamine and α-n-propyl-β-mercaptopropionic acid;

3-n-hexyl-5,5,6-trimethyl-4- metathiazanone using n-hexylamine and α,α-dimethyl-β-mercaptobutyric acid;

5-ethyl-3-n-hexyl-6-isopropyl-4-metathiazanone using n-hexylamine and α-ethyl-β-mercapto-γ-methylvaleric acid; and 6-ethyl-3-n-octyl-5-n-propyl-4-metathiazanone using octylamine and β-mercapto-α-n-propylvaleric acid.

EXAMPLE 10

3-(2-methoxyethyl)-4-metathiazanone was prepared as follows: A mixture containing 6.0 g. of paraformaldehyde, 23.0 g. of 65% aqueous 2-methoxyethylamine solution and 200 cc. of benzene was refluxed for 6 hours with a continuous separator connected to the reaction vessel for removal of water. After this heating period, 10.6 cc. of water had been collected. To the cooled reaction mixture was added 23.0 g. of β-mercaptopropionic acid and refluxing was continued for an additional 16 hours. A total of 14.4 cc. of water had been collected. The reaction mixture was cooled and poured into dilute aqueous ammonium hydroxide solution; and the mixture was shaken well. The benzene layer was separated, washed with water, dried over anhydrous calcium sulfate and evaporated in vacuo to remove the benzene. The remaining oily material was distilled in vacuo to yield 5.3 g. of the product, 3-(2-methoxyethyl)-4-metathiazanone, a colorless oil, B.P. 74° C. at 0.28 mm.

*Analysis.*—Calcd. for $C_7H_{13}NO_2S$: N, 7.99; S, 18.2. Found: N, 7.85; S, 18.0.

EXAMPLE 11

3-(2-hydroxyethyl)-4-metathiazanone, a clear oil, B.P. 130° C. at 0.04 mm., was prepared following the procedure described in Example 10 using 9.0 g. of paraformaldehyde, 18.3 g. of ethanolamine, 130 cc. of benzene and 31.8 g. of β-mercaptopropionic acid.

EXAMPLE 12

3-(3-hydroxpropyl)-4-metathiazanone, a clear oil, B.P. 125–127° C. at 0.005 mm., was prepared following the procedure described in Example 10 using 9.0 g. of paraformaldehyde, 22.2 g. of 3-hydroxpropylamine, 100 cc. of benzene and 31.8 g. of β-mercaptopropionic acid.

EXAMPLE 13

3-(2-methoxyethyl)-4-metathiazanone-1-oxide was prepared as follows: Solutions containing 14.8 g. of 3-(2-methoxyethyl)-4-metathiazanone in 100 cc. of benzene and 17.9 g. of 40% peracetic acid in 100 cc. of ethyl acetate were both cooled to 5° C., and the latter solution was added dropwise with stirring to the former, keeping the temperature below 10° C. After the addition had been completed (about 45 minutes), the reaction mixture was stirred with cooling for about 30 minutes. The reaction mixture was washed with aqueous sodium bisulfite solution and the solvent removed by distilling in vacuo. The remaining oily material was distilled in vacuo, yielding a fraction of 13.5 g. of product, 3-(2-methoxyethyl)-4-metathiazanone-1-oxide, a colorless oil, B.P. 40° C. at 0.060 mm. The product crystallized on standing and was recrystallized twice from isopropyl alcohol to yield 4.5 g. of the product as colorless crystals, M.P. 68.2–69.6° C. (corr.) after drying at 40° C. for three days at 0.020 mm.

*Analysis.*—Calcd. for $C_{17}H_{13}NO_3S$: C, 43.95; H, 6.85; N, 7.32. Found: C, 44.01; H, 6.83; N, 7.17.

Following the procedure described in Example 13 and using molar equivalent quantities of the corresponding 3-substituted-4-metathiazanone and peracetic acid, the following 3-substituted -4-metathiazanone-1-oxides can be prepared:

3-methyl-4-metathiazanone-1-oxide,
3-benzyl-4-metathiazanone-1-oxide,
3-ethyl-4-metathiazanone-1-oxide,
3-n-decyl-4-metathiazanone-1-oxide,
3-(6-hydroxyhexyl)-4-metathiazanone-1-oxide,
3-(2-n-propoxypropyl)-4-metathiazanone-1-oxide,
3-(4-ethoxybutyl)-4-metathiazanone-1-oxide,
3-(2-n-hexoxyethyl)-4-metathiazanone-1-oxide,
3-[4-(4-ethylphenoxy)butyl]-4-metathiazanone-1-oxide,
3-[2-(2,4,6-trimethylphenyl)ethyl]-4-metathiazanone-1-oxide,
3-[2-(4-n-butoxyphenoxy)ethyl]-4-metathiazanone-1-oxide,
3-[3-(3-ethylmercaptophenyl)propyl]-4-metathiazanone-1-oxide,
3-[4-(2-methylsulfonylphenyl)butyl]-4-metathiazanone-1-oxide,
3-[3-(3-trifluoromethylphenoxy)propyl]-4-metathiazanone-1-oxide,
3-[2-(4-nitrophenyl)ethyl]-4-metathiazanone-1-oxide,
3-[2-(4-aminophenyl)ethyl]-4-metathiazanone-1-oxide,
3-[3-(3,4,5-trimethoxyphenyl)propyl]-4-metathiazanone-1-oxide,
3-[2-(4-n-butylaminophenyl)ethyl]-4-metathiazanone-1-oxide,
3-[3-(3-propionylaminophenyl)propyl]-4-metathiazanone-1-oxide,
3-[2-(4-hydroxyphenyl)ethyl]-4-metathiazanone-1-oxide,
3-n-heptyl-5-methyl-4-metathiazanone-1-oxide,
5-ethyl-3-isobutyl-4-metathiazanone-1-oxide,
5,5-dimethyl-3-(2-methoxyethyl)-4-metathiazanone-1-oxide,
5,5-diethyl-3-[2-(4-methoxyphenoxy)ethyl]-4-metathiazanone-1-oxide,
3-n-octyl-5-n-propyl-4-metathiazanone-1-oxide,
3-n-hexyl-5,5,6-trimethyl-4-metathiazanone-1-oxide,
5-ethyl-3-n-hexyl-6-isopropyl-4-metathiazanone-1-oxide,
6-ethyl-3-n-octyl-5-n-propyl-4-metathiazanone-1-oxide,
3-n-butyl-4-metathiazanone-1-oxide,
3-n-heptyl-4-metathiazanone-1-oxide,
3-n-octyl-4-metathiazanone-1-oxide,
3-n-nonyl-4-metathiazanone-1-oxide,
3-(2-hydroxyethyl)-4-metathiazanone-1-oxide,
3-(3-hydroxypropyl)-4-metathiazanone-1-oxide,
3-(2-phenethyl)-4-metathiazanone-1-oxide,
3-(2-phenoxyethyl)-4-metathiazanone-1-oxide, 3-[2-(4-chlorophenoxy)ethyl]-4-metathiazanone-1-oxide, and, 3-[2-(3,4-dichlorophenoxy)ethyl]-4-metathiazanone-1-oxide.

EXAMPLE 14

3-n-hexyl-4-metathiazanone-1-oxide was prepared following the procedure described in Example 13 using 9.0 g. of 3-n-hexyl-4-metathiazanone, 50 cc. of benzene, 9.5 g. of 40% peracetic acid and 60 cc. of ethyl acetate. There was thus obtained 2.0 g. of the product, M.P. 74.8–76.4° C. (corr.), after one recrystallization from ethylene dichloride and one from n-hexane.

*Analysis.*—Calcd. for $C_{10}H_{19}NO_2S$: C, 55.20; H, 8.47; N, 6.43; O, 14.70; S, 14.71. Found: C, 55.38; H, 8.50; N, 6.26; O, 14.50; S, 14.42.

EXAMPLE 15

3-n-hexyl-4-metathiazanone-1,1-dioxide was prepared as follows: To a stirred solution of 9.0 g. of 3-n-hexyl-4-metathiazanone in 50 cc. of acetic acid kept below 30° C. was added dropwise with stirring a solution of 10.2 g. of potassium permanganate in 50 cc. of water. The reaction mixture was then stirred an additional 30 minutes and was decolorized by adding a solution of aqueous sodium bisulfite solution. The resulting mixture was stirred with cooling; and the precipitated product was collected and dried at 60° C. in a vacuum oven overnight. There was thus obtained 7.0 g. of the product, 3-n-hexyl-4-metathiazanone-1,1-dioxide, M.P. 89.2–90.0° C. (corr.).

*Analysis.*—Calc'd. for $C_{10}H_{19}NO_3S$: N, 6.01; S, 13.72. Found: N, 6.01; S, 14.21.

Following the procedure described in Example 15 using molar equivalent quantities of the corresponding 3-substituted -4-metathiazanone and potassium permanganate the 3-substituted-4-metathiazanone-1,1-dioxides of Table B were obtained.

Table B

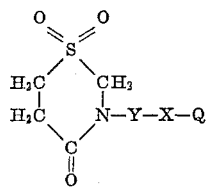

| Example | Y | X | Q | M.P., ° C. (corr.) |
|---|---|---|---|---|
| 16 | $(CH_2)_6$ | | $CH_3$ | 88.0–89.4 |
| 17 | $(CH_2)_6$ | | $C_2H_5$ | 90.0–91.0 |
| 18 | $(CH_2)_2$ | O | $C_6H_5$ a | 90.6–91.4 |
| 19 | $(CH_2)_2$ | | $C_6H_5$ a | 143.7–144.5 | a $C_6H_5$=phenyl.

Following the procedure described in Example 15 and using molar equivalent quantities of the corresponding 3-substituted-4-metathiazanone and potassium permanganate, the following 3-substituted-4-metathiazanone-1,1-dioxides can be prepared:

3-methyl-4-metathiazanone-1,1-dioxide,
3-benzyl-4-metathiazanone-1,1-dioxide,
3-ethyl-4-metathiazanone-1,1-dioxide,
3-n-decyl-4-metathiazanone-1,1-dioxide,
3-(6-hydroxyhexyl)-4-metathiazanone-1,1-dioxide,
3-(2-n-propoxyproyl)-4-metathiazanone-1,1-dioxide,
3-(4-ethoxybutyl)-4-metathiazanone-1,1-dioxide,
3-(2-n-hexoxyethyl)-4-metathiazanone-1,1-dioxide,
3-[4-(4-ethylphenoxy)butyl]-4-metathiazanone-1,1-dioxide,
3-[2-(2,4,6-trimethylphenyl)ethyl]-4-metathiazanone-1,1-dioxide,
3-[2-(4-n-butoxyphenoxy)ethyl]-4-metathiazanone-1,1-dioxide,
3-[3-(3-ethylmercaptophenyl)propyl]-4-metathiazanone-1,1-dioxide,
3-[4-(2-methylsulfonylphenyl)butyl]-4-metathiazanone-1,1-dioxide,
3-[3-(3-trifluoromethylphenoxy)propyl]-4-metathiazanone-1,1-dioxide,
3-[2-(4-nitrophenyl)ethyl]-4-metathiazanone-1,1-dioxide,
3-[2-(4-aminophenyl)ethyl]-4-metathiazanone-1,1-dioxide,
3-[3-(3,4,5-trimethoxyphenyl)propyl]-4-metathiazanone-1,1-dioxide,
3-[2-(4-n-butylaminophenyl)ethyl]-4-metathiazanone-1,1-dioxide,
3-[3-(3-propionylaminophenyl)propyl]-4-metathiazanone-1,1-dioxide,
3-[2-(4-hydroxyphenyl)ethyl]-4-metathiazanone-1,1-dioxide,
3-n-heptyl-5-methyl-4-metathiazanone-1,1-dioxide,
5-ethyl-3-isobutyl-4-metathiazanone-1,1-dioxide,
5,5-dimethyl-3-(2-methoxyethyl)-4-metathiazanone-1,1-dioxide,
5,5-diethyl-3-[2-(4-methoxyphenoxy)ethyl]-4-metathiazanone-1,1-dioxide,
3-n-octyl-5-n-propyl-4-metathiazanone-1,1-dioxide,
3-n-hexyl-5,5,6-trimethyl-4-metathiazanone-1,1-dioxide,
5-ethyl-3-n-hexyl-6-isopropyl-4-metathiazanone-1,1-dioxide,
6-ethyl-3-n-octyl-5-n-propyl-4-metathiazanone-1,1-dioxide,
3-n-butyl-4-metathiazanone-1,1-dioxide,
3-(2-hydroxyethyl)-4-metathiazanone-1,1-dioxide,
3-(3-hydroxypropyl)-4-metathiazanone-1,1-dioxide,
3-(2-methoxyethyl)-4-metathiazanone-1,1-dioxide,
3-[2-(4-chlorophenoxy)ethyl]-4-metathiazanone-1,1-dioxide, and,
3-[2-(3,4-dichlorophenoxy)ethyl]-4-metathiazanone-1,1-dioxide.

EXAMPLE 20

3-n-nonyl-4-metathiazanone-1,1-dioxide, was prepared as follows: To a cooled solution containing 4.7 g. of 3-n-nonyl-4-metathiazanone in 20 cc. of ethanol was added, with swirling, a cooled solution containing 11.0 g. of 40% peracetic acid in 50 cc. of ethyl acetate. The temperature of the reaction mixture rose to 30° C. The reaction mixture was allowed to stand at room temperature for two days; washed successively with dilute aqueous sodium bisulfite solution and water; and distilled in vacuo to remove the solvents. The resulting solid product was recrystallized twice from isopropyl alcohol to yield 2.8 g. of 3-n-nonyl-4-metathiazanone-1,1-dioxide, M.P. 95.8–96.8° C. (corr.).

*Analysis.*—Calcd. for $C_{13}H_{25}O_3NS$: C, 56.60; H, 9.08. Found: C, 56.24; H, 8.42.

The compounds of my invention protect against maximal electroshock and metrazol convulsions when tested intraperitoneally by standard procedures in mice, e.g., to protect 50% of the animals against maximal electroshock, the calculated doses ($PD_{50}$) of 3-n-hexyl-4-metathiazanone, 3-n-hexyl-4-metathiazanone-1,1-dioxide, 3-n-octyl-4-metathiazanone, 3-n-octyl-4-metathiazanone-1,1-dioxide, 3-n-heptyl-4-metathiazanone-1,1-dioxide, 3-(2-phenoxyethyl)-4-metathiazanone and 3-(2-phenoxyethyl)-4-metathiazanone-1,1-dioxide are, respectively, 245±17.4, 95±12, 154±13, 136±8.2, 106±12.2, 137±13.2 and 125±10.7 mg. per kg. Similarly, the intraperitoneal dose of 3-n-hexyl-4-metathiazanone-1-oxide required to protect 5 out of 10 mice from metrazol-induced convulsions was found to be 61±21 mg./kg.; also, when tested by the same method at a dose level of 100 mg./kg., 3-n-heptyl-4-metathiazanone and 3-n-nonyl-4-metathiazanone were found to protect, respectively, 10 out of 10 and 8 out of 10 mice from metrazol-induced seizures.

I claim:
1. A compound of the formula

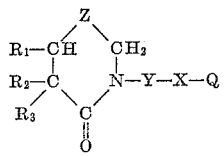

where Z is a member selected from the group consisting of S, SO and SO$_2$; Y is a member selected from the group consisting of alkylene having from two to six carbon atoms and having its two connecting linkages on different carbon atoms, and, methylene only when X is a direct linkage; X is a member selected from the group consisting of a direct linkage and O; Q is a member selected from the group consisting of hydrogen, lower-alkyl and phenyl; and, R$_1$, R$_2$ and R$_3$ each is a member selected from the group consisting of hydrogen and lower-alkyl.

2. A compound of the formula

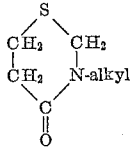

where the alkyl substituent has from six to nine carbon atoms inclusive.

3. A compound of the formula

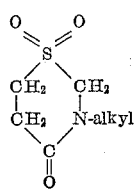

where the alkyl substituent has from six to nine carbon atoms inclusive.

4. A compound of the formula

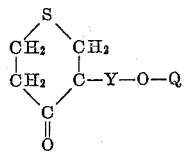

where Y is alkylene having from two to six carbon atoms and having its two connecting linkages on different carbon atoms, and Q is phenyl.

5. A compound of the formula

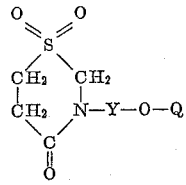

where Y is alkylene having from two to six carbon atoms and having its two connecting linkages on different carbon atoms, and Q is phenyl.

6. 3-n-hexyl-4-metathiazanone.
7. 3-n-hexyl-4-metathiazanone-1,1-dioxide.
8. 3-n-heptyl-4-metathiazanone.
9. 3-n-heptyl-4-metathiazanone-1,1-dioxide.
10. 3-n-octyl-4-metathiazanone.
11. 3-n-octyl-4-metathiazanone-1,1-dioxide.
12. 3-(2-phenoxyethyl)-4-metathiazanone.
13. 3-(2-phenoxyethyl)-4-metathiazanone-1,1-dioxide.

References Cited in the file of this patent

UNITED STATES PATENTS 3,082,209   Surrey _____ Mar. 19, 1963

FOREIGN PATENTS 815,203   Great Britain _____ June 17, 1959
866,761   Great Britain _____ May 3, 1961

UNITED STATES PATENT OFFICE
CERTIFICATE OF CORRECTION

Patent No. 3,155,655                              November 3, 1964

Alexander R. Surrey

It is hereby certified that error appears in the above numbered patent requiring correction and that the said Letters Patent should read as corrected below.

Column 4, line 58, for "3-[4-4-ethylphenoxy)butyl]-" read -- 3-[4-(4-ethylphenoxy)butyl]- --; column 5, line 14, for "3-[3-(-propionylaminophenyl)" read -- 3-[3-(3-propionylaminophenyl) --; line 15, for "(3-(3-propionylaminophenyl)" read -- 3-(3-propionylaminophenyl) --; line 59, for "0.28 mm." read -- 0.028 mm. --; line 71, for "3-(3-hydroxpropyl)" read -- 3-(3-hydroxypropyl) --; same column 5, line 74, for "3-hydroxpropylamine" read -- 3-hydroxypropylamine --; column 7, line 67, for "3-(2-n-propoxyproyl)" read -- 3-(2-n-propoxypropyl) --.

Signed and sealed this 20th day of April 1965.

(SEAL)
Attest:

ERNEST W. SWIDER                              EDWARD J. BRENNER
Attesting Officer                              Commissioner of Patents